Dec. 13, 1955 E. JAHODA 2,726,956

PHOTOGRAPHICALLY SENSITIVE DIAZO PAPER

Filed Dec. 18, 1953 2 Sheets-Sheet 1

INVENTOR.
Edward Jahoda
BY
Dull and Kane
ATTORNEYS

Dec. 13, 1955 E. JAHODA 2,726,956

PHOTOGRAPHICALLY SENSITIVE DIAZO PAPER

Filed Dec. 18, 1953 2 Sheets-Sheet 2

INVENTOR
Edward Jahoda
BY
Kane, Dalsimer and Kane
ATTORNEYS

United States Patent Office 2,726,956

Patented Dec. 13, 1955

2,726,956

PHOTOGRAPHICALLY SENSITIVE DIAZO PAPER

Edward Jahoda, Manhasset, N. Y., assignor to H. P. Andrews Paper Company, New York, N. Y., a corporation of New York

Application December 18, 1953, Serial No. 399,103

9 Claims. (Cl. 95—8)

Figure 1:
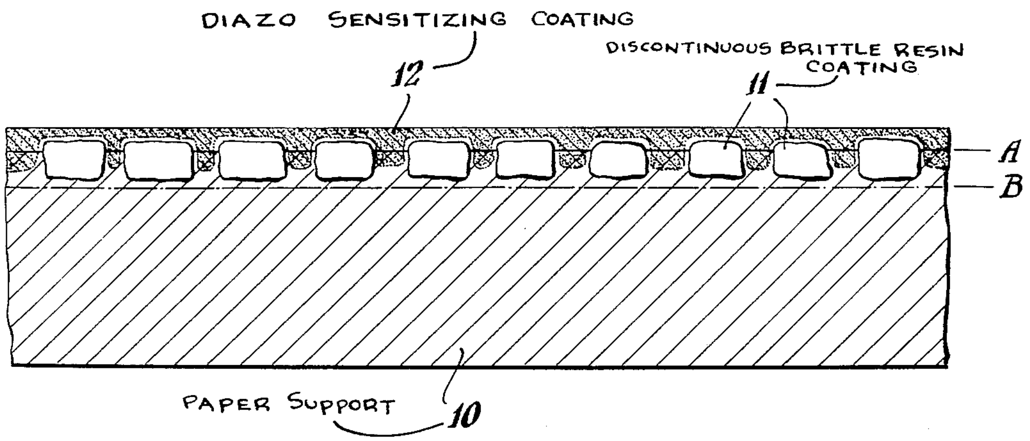

This invention relates to preparing photosensitive materials, and more particularly to providing a photosensitive paper having a pre-coated surface for receiving light-sensitive compounds.

Diazo printing is based on the ability of certain aromatic diazo-compounds to form highly colored dyestuffs by a reaction with certain compounds such as phenols, napthols, etc. which is called coupling, and to lose this ability on exposure to actinic light. Thus reproductions can be obtained by exposing a selectively absorbent original and a base material containing such a light-sensitive diazo compound to actinic light and by coupling the diazo-compound that remained unchanged after the exposure.

At the present time, two different types of diazo printing processes are in use, the "dry" process and the "semi-wet" process so called by differences in developing the prints. In the "dry" process diazo-compound and coupler are contained in the base material before the light exposure under conditions where coupling cannot take place; after the exposure these conditions are removed and the coupling reaction takes place, this is being performed by means of ammonia vapor, steam, heat or radiation; in any case the print is finished in a completely dry way. In the "semi-wet" process the base material contains just the diazo-compound before the light exposure but not the coupler; after the exposure the prints are developed by a solution containing the coupler, they are finished in a moist (semi-dry) way.

The requirements for diazo printing materials are very exacting. They must keep well before and after the light exposure; they must permit printing and developing at fast speeds and yield good reproductions of very different originals over a wide range of speeds. The image must be distinct, sharp and permanent, the background of the prints must be clean so as to insure high contrast and good legibility. The prints must have a good writing surface and must be suitable for water-coloring. Much effort is being expended to meet these requirements by improving sensitizing solutions as well as base materials.

A pre-coat of the base material in a light-sensitive product improves the product by providing a surface in which the particles on the surface are arranged more regularly than the pores of the base material. Accordingly, the photosensitive compound is used to better advantage when it is coated upon a base material that has been pre-coated. The pre-coat in a photosensitive product intensifies the image produced on the photosensitive surface and improves the appearance of the final print in general. The density and the color brilliance of the diazo type prints are increased by this pre-coating of the base material. A bolder color is obtained.

Previous pre-coating has not been adapted to diazo printing because of the reduced printing speed of the diazo printing material and also because of the objectionable discoloration of the background of the diazo prints resulting when the pre-coating is used. Further it is often desirable to write or water-color on diazo prints and previous pre-coated surfaces are not amenable to the requirements of writing and water-coloring as they cause excessive feathering.

It is, therefore, an object of this invention to improve the appearance, intensity, density, color brilliance, printing range and legibility of diazo prints by a pre-coat on the base material.

It is a further object of this invention to provide a pre-coat on the base material for a diazo photosensitive compound which avoids discoloration of the final print and avoids reduction of the printing speed.

It is another object of this invention to provide a method of pre-coating a base material in the preparation of diazo photosensitive materials which pre-coating will improve the appearance, intensity, printing range, density, color brilliance and legibility of the diazo prints produced by the method of this invention.

It is a still further object of this invention to provide a diazo photosensitive sheet which is wettable and which will permit ink writing on the surface of the diazo print.

Figure 2:
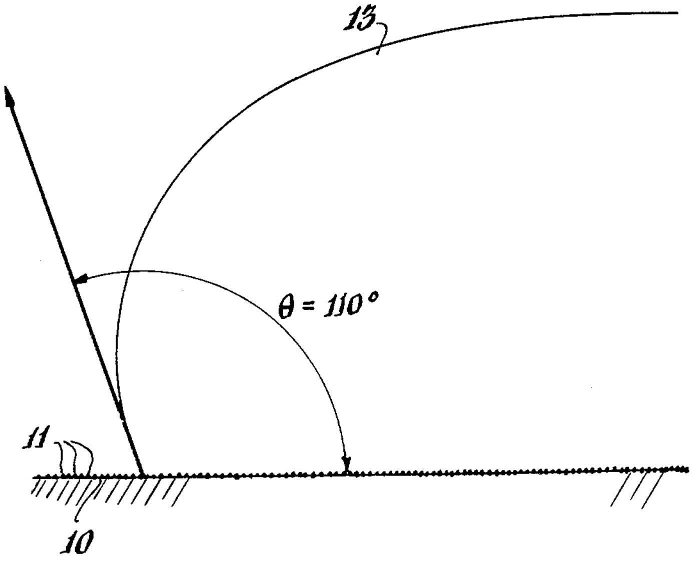

This and other objects of this invention will become more apparent upon the consideration of the following description, taken together with the accompanying drawing in which:

Fig. 1 is a schematic view of a diazo photosensitive sheet of this invention made up of a base material for diazo printing and a pre-coat of this invention and a diazo photosensitive layer, and Fig. 2 is a schematic view of a surface of the pre-coat according to this invention supporting a drop of water.

In general, this invention provides a pre-coat of a base material for a diazo photosensitive product. The pre-coat is a discontinuous layer precipitated from a colloidal, homogenous, stable dispersion of a synthetic resin which forms a discontinuous layer on a surface. The discontinuous layer of this invention is coated on the surface of the print base. The pre-coat layer of this invention is inert to the ingredients of the sensitizing solution as well as being discontinuous. The particles that make up the discontinuous layer adhere to the surface of the base by their own nature and without additional binders or adhesives to form a firm bond with the print base. As the particles making up the discontinuous layer of this invention are inert to the ingredients of the sensitizing solution, the pre-coat layer does not change color at any time after the sensitizing and the developing steps. The discontinuous pre-coat layer of discrete particles of this invention is wettable by a liquid so as to permit ink writing on the surface of the print.

The discontinuous pre-coat layer of this invention may be obtained by a deposition from a colloidal, homogeneous stable dispersion of a synthetic resin which forms a discontinuous brittle glass-like and hard mass. The chemical compositions of synthetic resins which provide the layer of this invention include polymers of the acrylic, styrene and vinyl types and their polymers and co-polymers. The pre-coat layer of this invention, however, is not limited to polymers of this chemical composition, as will be pointed out below. The pre-coat of this invention, although it does not contain binders which tend to destroy the discontinuity of the layer, may contain ingredients such as emulsifying agents, fluorescent dyes, paper stains, sequestrants and wetters or components of the sensitizing solution which do not destroy the discontinuity of the layer.

A sheet of light-sensitive paper pre-coated according to this invention is shown schematically in Fig. 1. A sized base paper 10 has on its surface a pre-sensitizing layer 11 made up of a discontinuous synthetic resin. Over this layer 11 is a relatively continuous layer 12 of light-sensitive material. The zone through which the pre-sensitizing layer is principally absorbed is indicated as lying between the lines A and B. This is referred to as the zone of controlled absorption.

In obtaining the pre-sensitizing coat of this invention, the pre-coating can be carried out in many different ways as by coating, spraying or immersion. The particles of the pre-coating are not dissolved in their application.

However, the applied pre-coat must be completely dry before receiving the sensitizing solution so that the sensitizing solution can be coated on the pre-coat surface evenly. To obtain a dry condition for the pre-coat surface, drying can be carried out at an elevated temperature below the softening point of the particular resin used. The drying of the aplied pre-coat surface serves to remove the liquid carrier of the resin particles as by evaporation and to facilitate or hasten the precipitation of the resin to form the pre-coat surface. The softening point referred to above, refers to the melting, fusing, softening or plasticizing point of the polymer of the resin particles at which there is a change of physical properties of the polymer and the polymer tends to form a coherent continuous film or a tough rubbery mass.

The pre-coated surface having this discontinuous layer 11 is wettable. The wettability of the layer 11 is indicated in Fig. 2. In Fig. 2 a schematic view shows the base 10 and the layer 11. A drop of water 13 lies on the layer 11. The drop of water forms an angle of contact $\theta$ with the base 10 and the layer 11. According to this invention this angle of contact $\theta$ is 110° as shown in Fig. 2, or less.

The pre-coat material of this invention is a water-impervious synthetic resin in finely divided particle form. The particles are laid down from the dispersion and are of the order of one micron and smaller in the dispersion. These particles form a discontinuous layer when deposited on the base material, such as layer 11 on base 10 in Fig. 1. These particles have the characteristic of forming a layer which is discontinuous and if not supported, brittle. The pre-coat material of this invention evaporates from a liquid dispersion to a brittle, hard mass which has glass-like properties and breaks into fine dust at touch. It has been determined that a pre-coat material of this invention, when evaporated from a liquid dispersion must not form a soft, rubbery mass or a coherent film. A material which evaporates from a dispersion to form a soft, rubbery mass or a coherent film is unsuitable as a pre-coat material in this invention. The pre-coat material of this invention which evaporates to form a brittle, hard mass with glass-like properties has been found to form a discontinuous or non-continuous layer when deposited in a layer on a suitable surface. In addition to this characteristic, it will be understood that the pre-coat material of this invention has the properties of impermeability to liquids and adheres to a base material without binders or adhesives. The pre-coated paper base of this invention is coated with a diazo sensitizing solution. The pre-coat material is impervious to this diazo sensitizing material and thereby prevents objectionable discoloration, as will be pointed out in greater detail below.

The following table is illustrative of pre-coat materials according to this invention which provide brittle, hard masses upon evaporation of a dispersion in accordance with the above mentioned procedure. This table is not intended to be limitative upon this invention and sets forth representative materials that form a water-impervious discontinuous layer of discrete particles of colloidal size when applied to a suitable base material.

TABLE I

| Chemical Constitution | Layer Forming Properties | Manufactured By— | Trade Name |
|---|---|---|---|
| Acrylic-Styrene copolymer. | Discontinuous. | American Polymer. | Polysize 220. |
| 20NS Butadiene-Styrene copolymer, ratio 20-80. | do | do | Polysize 398. |
| Styrene content 85% | do | Dewey & Almy | Copolymer 34L. |
| Vinyl Chloride-Vinylidene chloride copolymer. | do | Dow Chemical | Latex #744. |
| Tetrafluoroethylene Resin | do | Du Pont | Teflon. |
| Hydrocarbon resin | do | Goodyear | Pliolite Latex 190. |
| Polystyrene | do | Monsanto | Merlson S. |

The following table sets forth synthetic resin materials which form a soft, rubbery mass or a coherent film upon evaporation by a dispersion of 5% by weight. These materials are representative of materials which are not precoat layer forming materials of this invention:

TABLE II

| Chemical Constitution | Layer Forming Properties | Manufactured By— | Trade Name |
|---|---|---|---|
| Butadiene-Styrene copolymer, ratio 35-65. | Continuous. | American Polymer. | Polysize 350. |
| Polyvinyl acetate | do | Dewey & Almy | Polymer Y. |
| Butadiene-Acrylo nitrile copolymer. | do | Goodyear | Chemigum 245B. |

The pre-coat of this invention is applied to customary base materials for diazo prints. These include cardboard, cloth, fabrics, films and paper. As paper is one of the most important base materials for diazo prints, an embodiment of this invention is described as applied to paper. Diazo base papers are sized either internally or on the surface to provide a small and controlled penetration of the paper by the sensitizing solution. The degree of sizing is critical and the pre-coat treatment of this invention does not affect the upper and lower limits of this range of sizing.

In order that the invention may be more fully understood, the following examples are given by way of illustration in which the pre-coat is applied to the face of the base material which is to receive the sensitizing solution. However, the invention is not limited to these examples, as will be more specifically pointed out hereafter.

*Example I*

A cardboard base is sprayed with a pre-coat solution made up of 25 parts of distilled water and one part of a stable, water dispersion of a discontinuous layer forming polystyrene containing 40% by weight of the solids in content, the solids content of the stable water dispersion being made up of particles in an average size below one micron in diameter. The discontinuous layer forming polystyrene (Merlon S) forms a hard, brittle mass upon evaporation in a layer from a dispersion of 5% solids. The sprayed cardboard base material is dried in a drying box by heated air at a temperature of 150° F. The treated cardboard is then treated with a sensitizing diazo solution to produce a diazo-sensitized printing material.

*Example II*

A paper base having a rag content of 5% is coated in a blueprint coating machine with a colloidal solution of 2% of a copolymer of styrene and acrylic resins in a stable water dispersion. The solids content of the stable water dispersion is made of particles in an average size of below 1 micron in diameter. The discontinuous layer forming copolymer of styrene and acrylic resins (Poly size 220) forms a hard, brittle, glass-like mass upon evaporation in a layer from a water dispersion. The coated base material is dried by contact with heated drying drums and then is coated with a diazo sensitizing solution on the same machine. The sensitized pre-coated paper is dried in a drying chamber at a temperature of 160° F.

*Example III*

A web of all-sulphite diazo machine-finished paper is passed through a tub-size press containing a diluted stable water dispersion of a vinyl-acrylic copolymer (Poly size 200). The water dispersion has a 40% solids content before dilution. The solids content of the water dispersion is made up of particles in an average size below 1 micron in diameter. The discontinuous layer-forming vinyl-acrylic copolymer forms a hard, brittle, glass-like mass upon evaporation in a layer from a dispersion. The stable water dispersion is diluted to a viscosity comparable to a 5% starch solution at 150° F. After the stable water dispersion of the resinous copolymer, it is deposited on the all-sulphite paper base material, and the paper is loft-dried. The dried paper is subsequently coated with a diazo sensitizing solution.

*Example IV*

A cardboard base is sprayed with a pre-coat solution made up of 25 parts of distilled water and 1 part of a stable water dispersion of butadiene-styrene copolymer in a ratio of 20% butadiene to 80% styrene. The water dispersion contains 40% of solids in content. The solids content of the stable water dispersion is made up of particles with an average size below 1 micron in diameter. The discontinuous layer-forming butadiene-styrene copolymer (Poly size 398–20NS) forms a hard, brittle, glass-like mass upon evaporation in a layer from a dispersion of solids. The sprayed cardboard base material is dried in a drying box by heated air at a temperature of 150° F. The treated cardboard is then coated with a sensitizing diazo solution to produce a diazo-sensitizing printing material.

*Example V*

A paper base having a rag content of 50% is coated in a blueprint coating machine with a colloidal solution of a copolymer having a styrene content of 85%. The colloidal solution is a stable water dispersion having a solids content made up of particles in an average size below 1 micron in diameter. The discontinuous layer-forming 85% styrene copolymer (Copolymer 34L) forms a hard, brittle, glass-like mass upon evaporation in a layer from a dispersion of solids. The sprayed cardboard base material is dried in a drying box by heated air and then is coated with a diazo sensitizing solution in the blueprint coating machine. The sensitized pre-coated paper is dried in a drying chamber at a temperature of 160° F.

*Example VI*

A cardboard base is sprayed with a pre-coat solution made up of 25 parts of distilled water to 1 part of a stable water dispersion of vinyl chloride-vinylidene chloride copolymer (Latex #744). The water dispersion contains 40% of solids of the copolymer. The solids content of the stable water dispersion is made up of particles with an average size below 1 micron in diameter. The discontinuous layer-forming copolymer forms a hard, brittle, glass-like mass upon evaporation in a layer from a dispersion. The sprayed cardboard base material is dried in a drying box by heated air at a temperature of 150° F. The treated cardboard is then treated with a sensitizing diazo solution to produce a diazo-sensitized printing material.

*Example VII*

Similarly to the method of Example VI, a cardboard base is sprayed with a resinous polymer of a discontinuous layer-forming nature from a stable water dispersion of 25 parts of distilled water and 1 part of a stable water dispersion containing 40% of resin particles having an average size of below 1 micron in diameter, in the following example:

Tetrafluoroethylene resin (Teflon) is a discontinuous layer-forming resin which forms a hard, brittle mass upon evaporation in a layer from a dispersion. The sprayed cardboard base material is dried in a drying box by heated air at a temperature of 150° F. The treated cardboard is then treated with a sensitizing diazo solution to produce a diazo sensitized printing material.

*Example VIII*

Similarly to Example VII, Pliolite Latex 190, hydrocarbon resin is coated on a cardboard base by spraying from a solution of 25 parts of distilled water and 1 part of a stable water dispersion containing 40% of resin solids. The hydrocarbon resin is discontinuous layer forming and evaporates from a dispersion to form a layer of a hard, brittle, glass-like nature. The sprayed cardboard base material is dried and sensitized similarly to the product in Example VII.

Pliolite Latex 190 is an aqueous colloidal dispersion of high styrene butadiene styrene copolymer resin particles.

As mentioned above, the resin particles of this invention are impervious to the diazo sensitizing solution. Diazo photosensitive compounds have decomposition products which oxidize to end products which are visually discernible. The result of such oxidation upon a photosensitive paper after the decomposition of the photosensitive compound leaves an objectionable discoloration on the photosensitive paper. The prevention or avoidance of this oxidation or the remnants of the oxidized decomposition products on the photosensitive paper is highly desirable. It is a feature of this invention that the production of this undesirable discoloration is avoided. This discoloration is avoided by not promoting the oxidation of the decomposition products and also by allowing the photosensitive compound to penetrate the resin precoat in only indiscernible or imperceptible amounts so that the effect of its oxidation is minimized.

The operations of precoating, drying, sensitizing and drying set forth in the above examples may be conducted successively in one continuous operation or the steps may be done individually and separated in time. The application of the synthetic resin precoat may be carried on as a final step in the operation of finishing the base materials or as a preliminary step in the process of sensitizing the sheet. The application of the synthetic resin precoat may also be completely separate as an operation divorced from the paper finishing or the paper sensitizing operations. Preferably the coating is applied to the face side of the base material, that is, the side to which the sensitizing solution will be applied. However, the precoat solution can be applied to the back or reverse side of the base material if the latter is paper. In the application of the precoat solution to the back side, enough wetting agent must be provided to insure permeation of the resin through the base material to form the required layer on the face side.

The precoat layer of this invention provides a wettable surface. As described above in connection with Fig. 2, this wettability causes droplets on the surface of the layer to have an angle of contact of less than 110°. A spray of water on the surface deposits droplets which will disappear upon the discontinuous layer of this invention. If the spray of water droplets do not disappear when sprayed on a resinous layer, the layer is not made up of a discontinuous layer of discrete particles having an average size of less than 1 micron, deposited according to this invention. It has been found that the deposition of particles of resin can be carried out to the point where a continuous film is formed. Accordingly, the deposition must be limited to forming a discontinuous film. It is believed that some degree of porosity of the film is necessary to preserve the necessary discontinuity of the layer. It has been found that an acceptable weight of deposit of the resin particles on the precoated surface is about 1 pound of resin particles per hundred square yards of surface for resins of the molecular weight of the polystyrene copolymer of Example I. This will vary in accordance with the molecular weight of the resin material.

It has also been found that fusing of the resin causes the layer to lose its wettability. A spray of water droplets upon a fused layer which has become a continuous film deposits droplets upon the continuous film which remain and do not disappear, and indicate that the layer is not satisfactory as a precoat for a sensitizing solution in the method of this invention and will not produce the product of this invention.

The precoating of the base material according to this invention provides a surface which is superior to previous precoat surfaces, not only in the surface adaptability to diazo printing but also in providing a surface in which there are particles relatively non-porous. As a consequence of the non-porosity, the particles are more resistant to penetration by the sensitizing solution. Another advantage of this invention is found in the absence of a slow-down in the use of the final sensitized paper. Other advantages include an increase of the range of printing speeds so that a better quality print may be obtained both at a faster as well as at a slower speed than is possible without the precoat. The precoated papers of this invention also receive the application of liquid such as ink and water colors better than previous precoated sensitized surfaces. There is no feathering. In addition the keeping or lasting qualities of the diazo prints resulting from the product of this invention are improved over previous diazo sensitized paper.

The precoated diazo paper of this invention also provides clearer or truer colored prints than has heretofore been possible. The prints prepared on precoated paper of this invention have a greater brilliance and a luster that simulates a three-dimensional appearance.

Various modifications and substitutions of the embodiments in the above noted description may be made according to this invention. The synthetic resins useful for the practice of the invention are characterized by the physical characteristics set forth above. The great majority of suitable resins, however, is found among the addition polymers of the unsymmetrically substituted ethylene class which comprises the resins obtained by the polymerization or copolymerization of monomers containing a $$CH_2=\overset{|}{C}-$$

group, such as vinyl esters, vinylidene halides, styrene and acrylics. Also the precoat of this invention may be used for base materials for other sensitizing solutions. This invention has been described in connection with diazo printing for the purpose of illustrating an embodiment of the invention. It will therefore be understood that modifications of the above described embodiments may be made without departing from the spirit of the invention.

This application is a continuation in part application of my co-pending United States application Serial Number 144,333, filed February 15, 1950, now abandoned.

I claim:

1. As a new article of manufacture a photosensitive diazo paper comprising a penetration resistant paper base and a discontinuous layer of discrete, brittle, water-impervious styrene resin particles having an average particle size of less than 1 micron in diameter adhered to said base, said particles formed in said discontinuous layer by evaporation of an aqueous dispersion of said resin at a temperature below the softening point of the resin to produce a hard brittle mass which disintegrates on impact into a fine dust and said base and resin sensitized over the resin surface with a solution of a photosensitive diazo compound.

2. As a new article of manufacture a photosensitive diazo paper comprising a penetration resistant paper base and a discontinuous layer of discrete, brittle, water-impervious styrene-acrylic ester copolymer resin particles having an average particle size of less than 1 micron in diameter adhered to said base, said particles formed in said discontinuous layer by evaporation of an aqueous dispersion of said resin at a temperature below the softening point of the resin to produce a hard brittle mass which disintegrates on impact into a fine dust and said base and resin sensitized over the resin surface with a solution of a photosensitive diazo compound.

3. As a new article of manufacture a photosensitive diazo paper comprising a penetration resistant paper base and a discontinuous layer of discrete, brittle, water-impervious high styrene butadiene-styrene copolymer resin particles having an average particle size of less than 1 micron in diameter adhered to said base, said particles formed in said discontinuous layer by evaporation of an aqueous dispersion of said resin at a temperature below the softening point of the resin to produce a hard brittle mass which disintegrates on impact into a fine dust and said base and resin sensitized over the resin surface with a solution of a photosensitive diazo compound.

4. As a new article of manufacture a photosensitive diazo paper comprising a penetration resistant paper base and a discontinuous layer of discrete, brittle, water-impervious vinyl chloride-vinylidene chloride copolymer resin particles having an average particle size of less than 1 micron in diameter adhered to said base, said particles formed in said discontinuous layer by evaporation of an aqueous dispersion of said resin at a temperature below the softening point of the resin to produce a hard brittle mass which disintegrates on impact into a fine dust and said base and resin sensitized over the resin surface with a solution of a photosensitive diazo compound.

5. As a new article of manufacture a photosensitive diazo paper comprising a penetration resistant paper base and a discontinuous layer of discrete, brittle, water-impervious tetrafluoroethylene resin particles having an average particle size of less than 1 micron in diameter adhered to said base, said particles formed in said discontinuous layer by evaporation of an aqueous dispersion of said resin at a temperature below the softening point of the resin to produce a hard brittle mass which disintegrates on impact into a fine dust and said base and resin sensitized over the resin surface with a solution of a photosensitive diazo compound.

6. As a new article of manufacture, a photosensitive diazo paper comprising a penetration resistant paper base and a discontinuous layer of discrete, brittle, hard, water-impervious ethylene resin particles adhered to said base, said resin particles obtained by the addition polymerization of an ethylene monomer containing the $$CH_2=\overset{|}{C}-$$

group, having a particle size of less than one micron in diameter and being formed in said discontinuous layer by evaporation of an aqueous dispersion of said resin particles at a temperature below the softening point of the resin to produce a hard brittle mass on said base which disintegrates on impact into a fine dust and said base and resin sensitized over the resin surface with a solution of a photosensitive diazo compound.

7. As a new article of manufacture, a photosensitive diazo paper comprising a penetration resistant paper base and a discontinuous layer of discrete, brittle, hard, water-impervious ethylene resin particles adhered to said base, said resin particles obtained by the addition polymerization of an ethylene monomer containing the $$CH_2=\overset{|}{C}-$$

group, having a particle size of less than one micron in diameter and being formed in said discontinuous layer by evaporation of an aqueous dispersion of said resin particles at a temperature below the softening point of the resin to produce a hard brittle mass on said base which disintegrates on impact into a fine dust, said sized paper and discontinuous layer of water impervious discrete resin particles supporting a water drop with an inside contact angle no greater than 110°, and said base and resin sensitized over the resin surface with a solution of a photosensitive diazo compound.

8. As a new article of manufacture, a photosensitive diazo paper comprising a penetration resistant diazo paper base and a discontinuous layer of discrete, brittle, hard, water-impervious ethylene particles, said resin selected from the group consisting of polystyrene, styrene-acrylic ester copolymers, high styrene butadiene-styrene copolymers, vinyl chloride-acrylic ester copolymers, vinyl chloride-vinylidene chloride copolymers and tetrafluoroethylene, said discontinuous layer formed by evaporation of an aqueous dispersion of said resin particles at a temperature below the softening point of said resin to produce a hard brittle mass on said base which disintegrates on impact into a fine dust, and said base and resin sensitized over the resin surface with a solution of a photosensitive diazo compound.

9. A method of preparing a photosensitive diazo paper comprising applying to a sized penetration resistant paper base an aqueous dispersion of an ethylene resin having a particle size of less than one micron in diameter which is obtained in the form of hard, brittle, discrete resin particles by the addition polymerization of an ethylene monomer containing the $$CH_2=\overset{|}{C}-$$

group, drying said dispersion at a temperature below the softening point of said resin to thereby form a discontinuous layer of said discrete brittle particles adhering to said base, said particles forming a mass which disintegrates upon impact into a fine dust, and sensitizing said base and discontinuous layer with a solution of a light sensitive diazo compound.

References Cited in the file of this patent

UNITED STATES PATENTS

| | | |
|---|---|---|
| 2,327,380 | Toland et al. | Aug. 24, 1943 |
| 2,360,216 | Fillius | Oct. 10, 1944 |
| 2,433,515 | Jahoda | Dec. 30, 1947 |

FOREIGN PATENTS

| | | |
|---|---|---|
| 418,976 | Great Britain | Nov. 5, 1934 |
| 562,666 | Great Britain | July 11, 1944 |